(12) United States Patent
Ahmad et al.

(10) Patent No.: US 6,175,469 B1
(45) Date of Patent: Jan. 16, 2001

(54) DISC DRIVE MAGNET HOUSING ELECTRO MECHANICAL RESONANCE DAMPENING SYSTEM

(75) Inventors: Mohammad N. Ahmad, Oklahoma City; Kenneth L. Pottebaum, Yukon; Ryan T. Ratliff, Oklahoma City, all of OK (US)

(73) Assignee: Seagate Technology, Inc., Scotts Valley, CA (US)

(*) Notice: Under 35 U.S.C. 154(b), the term of this patent shall be extended for 0 days.

(21) Appl. No.: 09/205,437

(22) Filed: Dec. 4, 1998

Related U.S. Application Data

(60) Provisional application No. 60/078,928, filed on Mar. 20, 1998.

(51) Int. Cl.[7] .................................................. G11B 33/14
(52) U.S. Cl. ..................................... 360/97.02; 360/264.9
(58) Field of Search ............................ 360/97.01, 99.12

(56) References Cited

U.S. PATENT DOCUMENTS

| | | |
|---|---|---|
| 4,491,888 * | 1/1985 | Brown ............................. 380/97.02 |
| 5,235,482 | 8/1993 | Schmitz . |
| 5,725,931 | 3/1998 | Landin et al. . |
| 5,757,580 | 5/1998 | Andress et al. . |

* cited by examiner

*Primary Examiner*—A. J. Heinz
(74) *Attorney, Agent, or Firm*—Crowe & Dunlevy

(57) ABSTRACT

A damper for dampening resonance created by a voice coil motor of a disc drive and transmitted to a supporting enclosure, the resonance capable of creating noise signals to the disc drive servo control system. The damper has a dampening member and a liner, the liner being a magnetically permeable member that is magnetically attracted to the voice coil motor and thereby pressingly engaging a magnet housing of the voice coil motor. In a preferred embodiment the dampening member is an acrylic polymer. In an alternative embodiment the dampening member is a fluoroelastomer. The magnet housing has characteristic features that increase the magnetic flux to the liner.

19 Claims, 5 Drawing Sheets

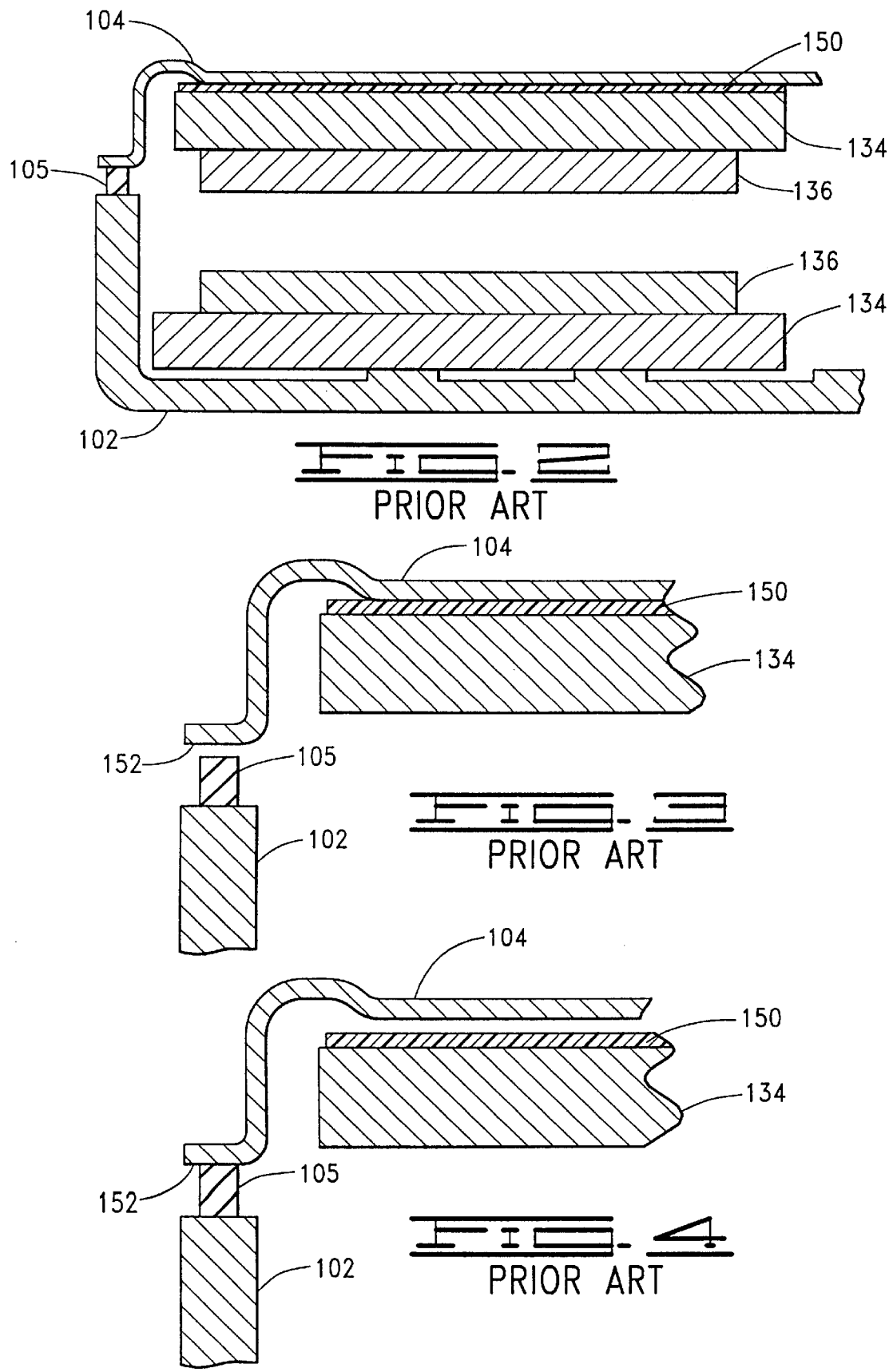

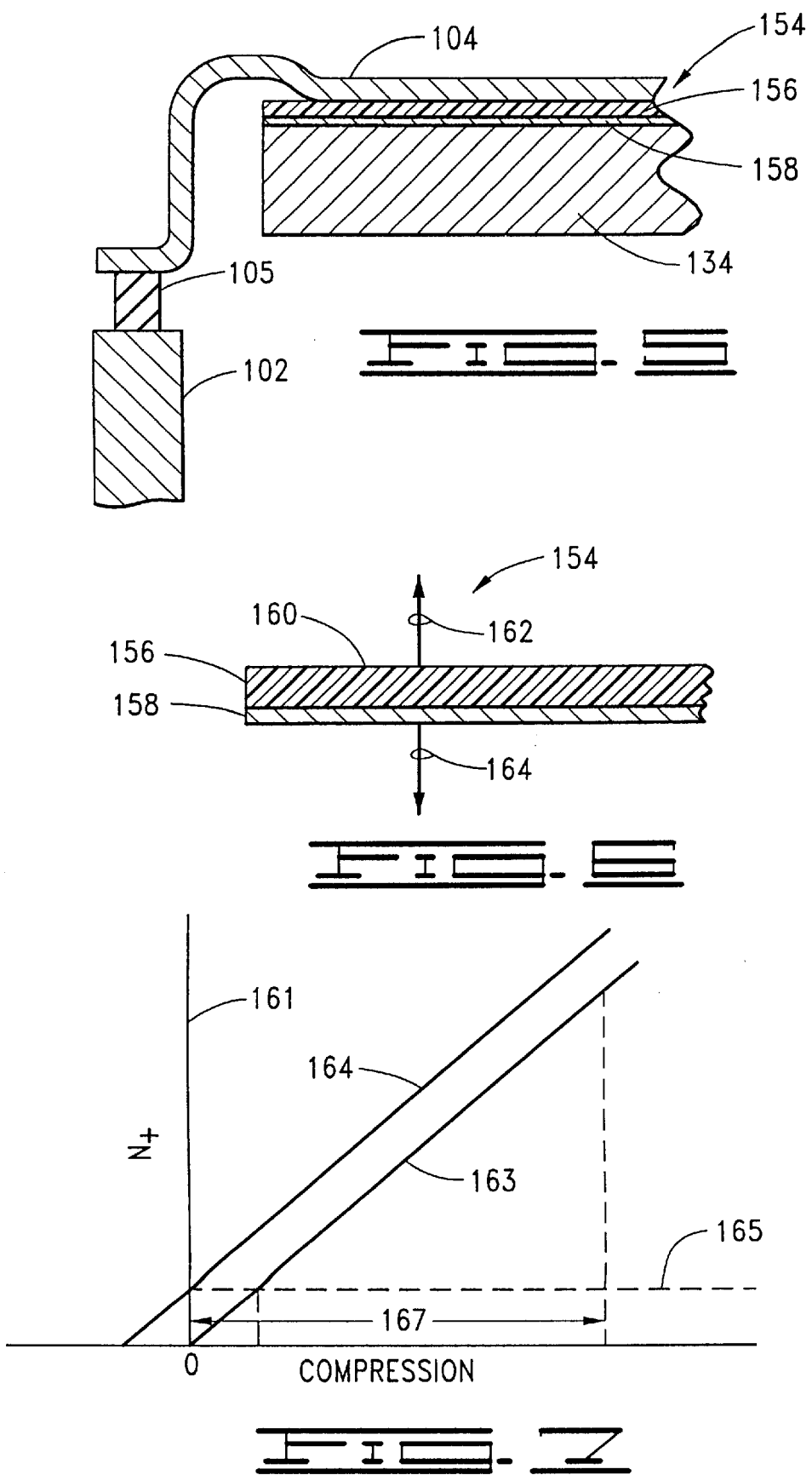

DISC DRIVE MAGNET HOUSING ELECTRO MECHANICAL RESONANCE DAMPENING SYSTEM

RELATED APPLICATIONS

This application claims the benefit of U.S. Provisional Application No. 60/078,928 entitled MAGNET HOUSING DAMPER filed Mar. 20, 1998.

FIELD OF THE INVENTION

The present invention relates generally to the field of disc drive data storage devices, and more particularly but not by way of limitation, to a resonance dampening damper for a voice coil motor in a disc drive.

BACKGROUND OF THE INVENTION

Modern disc drives are commonly used in a multitude of computer environments, ranging from super computers to notebook computers, to store large amounts of data in a form that is readily available to a user. Typically, a disc drive has one or more magnetic discs that are rotated by a spindle motor at a constant high speed. Each disc has a data storage surface divided into a series of generally concentric data tracks that are radially spaced across a band having an inner diameter and an outer diameter. The data is stored within the data tracks on the disc surfaces in the form of magnetic flux transitions. The flux transitions are induced by an array of read/write heads. Typically, each data track is divided into a number of data sectors where data is stored in fixed size data blocks.

The read/write head includes an interactive element such as a magnetic transducer. The interactive element senses the magnetic transitions on a selected data track to read the data stored on the track. Alternatively, the interactive element transmits an electrical signal that induces magnetic transitions on the selected data track to write data to the track.

Each of the read/write heads is mounted to a rotary actuator arm and is selectively positioned by the actuator arm over a pre-selected data track of the disc to either read data from or write data to the data track. The read/write head includes a slider assembly having an air bearing surface that, in response to air currents caused by rotation of the disc, causes the head to fly adjacent to the disc surface with a desired gap separating the read/write head and the corresponding disc.

Typically, multiple center-open discs and spacer rings are alternately stacked on a spindle motor hub. The hub, defining the core of the stack, serves to align the discs and spacer rings around a common axis. Collectively the discs, spacer rings and spindle motor hub define a disc pack assembly. The surfaces of the stacked discs are accessed by the read/write heads which are mounted on a complementary stack of actuator arms which form a part of an actuator assembly. The actuator assembly generally includes features which conduct electrical signals from the read/write heads to a flex circuit which, in turn, conducts the electrical signals to a flex circuit connector mounted to a disc drive base deck.

When the disc drive is not in use, the read/write heads are parked in a position separate from the data storage surfaces of the discs. Typically, a landing zone is provided on each of the disc surfaces where the read/write heads are positioned before the rotational velocity of the spinning discs decreases below a threshold velocity which sustains the air bearing. The landing zones are typically located near the inner diameter of the discs.

Generally, the actuator assembly has an actuator body that pivots about a pivot mechanism that is receivingly disposed in a medial portion thereof. A motor, such as a voice coil motor, selectively positions a proximal end of the actuator body. This positioning of the proximal end in cooperation with the pivot mechanism causes a distal end of the actuator body, which supports the read/write heads, to move radially across the face of the discs.

The voice coil typically involves energizing an electrical coil that is supported by the pivotal actuator assembly in a manner that positions the electrical coil adjacent a stationary magnet assembly. A controlled current in the electrical coil thus causes the electrical field of the electrical coil to interact with the magnetic field of the magnet assembly to move the actuator assembly in accordance with the well-known Lorentz relationship.

The movement of the actuator assembly creates reactionary forces in the stationary magnet assembly that excite resonances in the disc drive assembly. A well known problem involves read/write head positioning errors caused by servo noise resulting from this resonance.

One approach to resolving this problem is associated with attempts to dampen the magnet assembly with respect to the disc drive enclosure. These attempts have met with difficulty and a lack of success. Due to manufacturing tolerance stacking, the traditional approach of using a compressed gasket has been shown likely to result in either an over-compression or an under-compression of the compressed gasket. The former can prevent proper sealing of the disc drive enclosure, and the latter can effectively nullify the damping affect.

There currently is a need in the art for a damper that will effectively and reliably dampen the resonance imparted to the disc drive by the magnet assembly and accommodate variations in the assembly of the magnet assembly within the disc drive.

SUMMARY OF THE INVENTION

The present invention is directed to a disc drive having a resonance dampening damper interposed between a magnet housing of a voice coil motor and an enclosure of the disc drive.

The voice coil motor operably moves an actuator assembly so as to radially position an array of read/write heads adjacent a desired track of a data disc. The actuator assembly supports an electrical coil which moves within a magnetic field produced by a magnet assembly. A magnet housing encloses an opposed pair of stationary magnets which form a part of the magnet assembly. As the electrical coil is electrically energized, an electro mechanical force acts on the actuator assembly to operably move the read/write heads radially across the disc. Reactive forces acting on the stationary magnet housing are transmitted to the disc drive enclosure. Because the enclosure also supports the actuator assembly, this resonance can induce positioning errors.

The damper of the present invention dampens the resonance that is otherwise imparted to the enclosure. The damper is interposed between the magnet housing and the disc drive enclosure, and has an elastomeric dampening member joined to a magnetically permeable liner.

In a preferred embodiment the magnetically permeable liner provides an attractive force urging the damper into engagement with the magnetic housing to ensure a pressing contact therebetween. In an alternative preferred embodiment an indentation is provided in the magnet housing to position the damper. In yet another preferred embodiment, the damper has a liner having a characteristic size and shape of the magnet housing so that the damper is self-aligning with respect to the magnetic housing.

The advantages and features of the present invention will be apparent from the following description when read in conjunction with the drawings and appended claims.

BRIEF DESCRIPTION OF THE DRAWINGS

FIG. 2 is a sectional view of a portion of the voice coil motor of the disc drive of FIG. 1, showing the opposing magnets supported by the magnet housing formed in part by the opposing poles.

FIG. 3 is a sectional view of a portion of a prior art damper, showing a typical condition wherein the enclosure seal is corrupted.

FIG. 4 is a sectional view of a portion of a prior art damper, showing a typical condition wherein the damper fails to engage the enclosure.

FIG. 5 is a sectional view of a portion of a damper that is constructed in accordance with a preferred embodiment of the present invention.

FIG. 6 is a sectional view of the damper of FIG. 5.

FIG. 7 is a graphical representation of the relationship between compression and resulting normal force provided by the prior art damper and a damper of the present invention.

DETAILED DESCRIPTION

Figure 1:
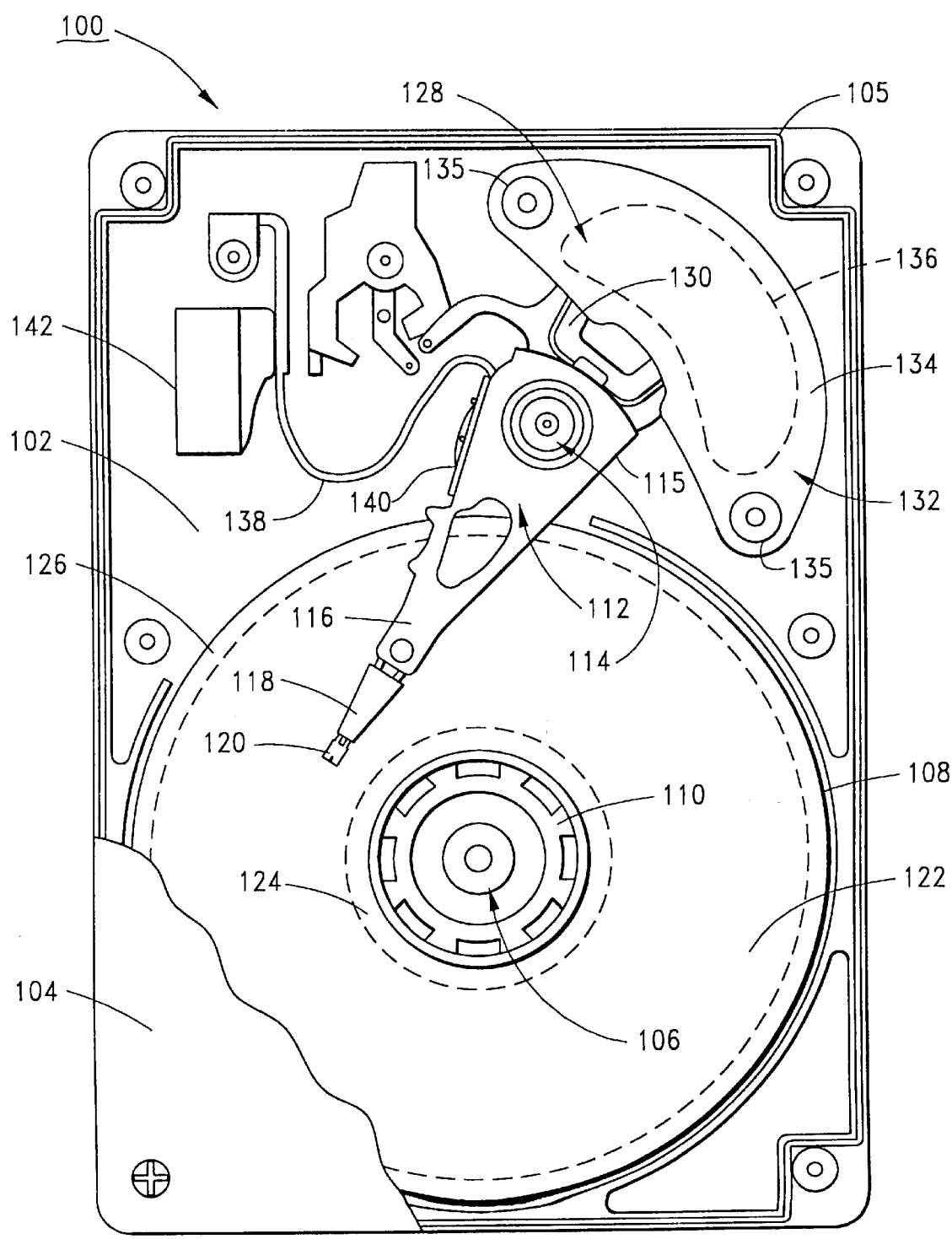
FIG. 1 is a plan view of a prior art disc drive which is particularly well suited to the practice of the present invention.

Referring to the drawings in general, and more particularly to FIG. 1, shown therein is a plan view of a disc drive 100 that is particularly well suited for practicing the present invention. The disc drive 100 includes a base deck 102 to which various disc drive components are mounted, and a cover 104 which together with the base deck 102 and a perimeter gasket 105 provide a sealed enclosure for the disc drive 100. The cover 104 is shown in a partial cut-away fashion to expose selected components of interest. It will be understood that numerous details of construction of the disc drive 100 are not included in the following description because they are well known to those skilled in the art and are believed to be unnecessary for the purpose of describing the present invention.

Mounted to the base deck 102 is a spindle motor 106 to which a plurality of discs 108 are mounted and secured by a clamp ring 110 for rotation at a constant high speed. Adjacent the discs 108 is an actuator assembly 112 which rotates about a pivot bearing assembly 114 in a plane parallel to the discs 108. The actuator assembly 112 includes an E-block 115 that is supported by the pivot bearing assembly 114. The E-block 115 has actuator arms 116 (only one shown) that support load arm assemblies 118. The load arm assemblies 118, in turn, support read/write heads 120, with each of the read/write heads 120 adjacent a surface of one of the discs 108. The read/write heads 120 are maintained in a data reading and writing spatial relationship by a conventional slider assembly (not shown) which supports the read/write head 120 in response to air currents generated by the spinning discs 108 during operation of the disc drive 100.

Each of the discs 108 has a data storage location with a data recording surface 122 divided into concentric circular data tracks (not shown), and the read/write heads 120 are positionably located adjacent data tracks to read data from or write data to the tracks. The data recording surface 122 is bounded at an inner extent by a circular landing zone 124 where the read/write heads 120 can come to rest against the discs 108 at times when the disc drive 100 is inoperable. In many instances the data recording surface 122 is similarly bounded at an outer extent by a circular snubber zone 126 where a conventional snubber (not shown) can contact the disc 108 to limit an axial runout of the discs 108.

The E-block 115 is positioned by a voice coil motor (VCM) 128, the VCM 128 having an actuator coil 130 supported by the E-block 115 and immersed in a magnetic field generated by a magnet assembly 132. A magnetically permeable flux path, such as provided by a pair of steel plates 134 (sometimes referred to as poles 134), completes the magnetic circuit of the VCM 128. The poles 134 are each attached to a pair of spacers 135 that are interposed therebetween, thereby supporting the poles 134 in a spatially separated and parallel relationship. A pair of magnets 136 are interposed between the poles 134, each magnet 136 being supported by one of the poles 134. In this manner the poles 134 and spacers 135 form a magnet housing for the opposing magnets 136, there being a gap between the magnets 136 in which the actuator coil 130 is movably disposed. Together, the magnet housing and the magnets 136 form the magnet assembly 132.

When controlled current is passed through the actuator coil 130, an electromagnetic field is set up which interacts with the magnetic circuit of the magnet assembly 132 to cause the actuator coil 130 to move relative to the magnets 136 in accordance with the well-known Lorentz relationship. As the actuator coil 130 moves, the E-block 115 pivots about the pivot bearing assembly 114 causing the actuator arms 116 to move the read/write heads 120 adjacent to and radially across the discs 108.

To provide the requisite electrical conduction paths between the read/write heads 120 and disc drive read/write circuitry (not shown), leads (not separately shown) are routed on the actuator assembly 112 from the read/write heads 120, along the load arm assemblies 118 and the actuator arms 116, to a flex circuit 138. The leads are secured by way of a suitable soldering process to corresponding pads of a printed circuit board (PCB) 140. In turn, the flex circuit 138 is connected to a flex circuit bracket 142 in a conventional manner which, in turn, is connected through the base deck 102 to a disc drive PCB (not shown) mounted to the underside of the base deck 102. The disc drive PCB provides the disc drive read/write circuitry which controls the operation of the read/write heads 120, as well as other interface and control circuitry for the disc drive 100.

Turning now to FIG. 2 which is a sectional view taken through a portion of the magnet assembly 132, wherein the actuator assembly 112 and the actuator coil 130 are not shown for clarity. It will be noted the spacers 135 are not included in the sectional view of FIG. 2, but that the spacers 135 support the poles 134 in the spatially parallel relationship shown. FIG. 2 more clearly shows the opposing poles 134, each supporting a magnet 136 which remains stationary in relation to the moving actuator coil 130 (not shown in FIG. 2) that is interposed between the magnets 136.

During disc drive 100 seek operations the actuator assembly 112 moves the read/write heads 120 from a current data track to a destination data track. The actuator assembly 112 moves in response to the introduction of a controlled current to the actuator coil 130 which creates electro mechanical forces that act on the actuator coil 130. Opposing reaction forces act on the stationary magnets 136 and on the magnet housing. The magnet housing is supported by the enclosure in a common manner, such as by threaded fasteners (not shown) joining the poles 134 to the base deck 102 and the cover 104. The enclosure similarly supports the actuator assembly 112, such as by threaded fasteners (not shown) joining the base deck 102 and cover 104 to the pivot bearing assembly 114. The disc pack, comprising the spindle motor 106 and discs 108, is also similarly supported by the enclave.

Thus it will be noted the enclosure provides a transmission path for vibrations between the magnet assembly, the actuator assembly 112, and disc pack. Through this path the reaction forces excite resonances that contribute to head positioning errors and can thus adversely affect the servo performance during seeking, reading, and writing operations.

For this reason attempts have been made to employ a damper between the magnet housing and the enclosure have been made. In one approach a dampening material, such as an elastomeric adhesive or sheet, is compressed between the magnet housing and the enclosure. Another approach is to use a constraint layer damper such as is taught by U.S. Pat. No. 5,725,931 issued to Landin. Constraint layer damping is a known approach for dampening the resonance associated with operations of a disc drive, such as according to the teaching of U.S. Pat. No. 5,757,580 issued to Andress et al. and assigned to the assignee of the present invention.

FIGS. 3 and 4 illustrate difficulties associated with the former approach of compressing at least a damper 150 between the magnet housing and the enclosure. These difficulties stem from the fact that the dampening material must be compressed at least a minimal amount in order to provide effective dampening performance, yet over-compression can adversely affect the seal between the base deck 102 and cover 104. Manufacturing tolerances in the components making up the disc drive 100 can stack up so as to provide more cumulative variation than can be compensated for with the compressed layer approach.

FIG. 3 particularly illustrates an overcompression condition. Here the damper 150 is over-compressed to the point of resisting the otherwise proper sealing engagement of a flange 152 of the cover 104 against the base deck 102. This condition results in an unsealed enclosure which impairs the disc drive by allowing contaminants into the drive.

FIG. 4 illustrates a converse condition wherein tolerance stack up results in a gap between the damper 150 and the cover 104 after attachment of the cover 104 to the base deck 102. Here the damper 150 is ineffective in dampening resonance in the magnet housing because there is lacking a sufficient compression of the damper 150 between the magnet housing and the enclosure.

The prior art damper 150 of FIGS. 3 and 4 is typically adhered to one component and has a liner to prevent it from also adhering to the adjacent component. For example, the damper 150 can be adhered to the cover 104, the liner thus preventing adhesion to the pole 134. A pressure sensitive adhesive is typically employed in adhering the damper 150, and the liner is typically a thin polyester sheet or an aluminum foil.

FIG. 5 shows a dampening member 154 constructed in accordance with the present invention, wherein an elastomeric member 156 is joined to a liner 158, the liner 158 being made of a magnetically permeable material, that is, a material that is magnetically attracted to the pole 134. In a preferred embodiment the liner 158 can be formed of a magnetically permeable stainless steel. The pole 134 imparts a magnetic attractive force by way of a magnetic flux leakage that exists in the magnet assembly 132.

FIG. 6 is an enlarged view of the dampening member 154 of FIG. 5, wherein the elastomeric member 156 is formed of a pressure sensitive adhesive suitable for adhesion with the cover 104. In a preferred embodiment the elastomeric member 156 is formed of an acrylic polymer. An acrylic polymer manufactured by 3M under the trade name ISD-112 is particularly well suited by this application.

A cover sheet (not shown), such as Mylar, can be used on the surface 160 to protect the integrity of the adhesive until such a time that the dampening member 154 is joined to the cover 104. In this manner, a conventional peel-and-stick method is employed in assembling the dampening member 154 to the cover 104. The liner 158 is adhered to the elastomeric member 156 so as to be interposed between the elastomeric member 156 and the pole 134.

The magnetic attraction force between the liner 158 and pole 134 draws the liner 158 with a pressing engagement against the pole 134 to enhance the dampening effect of the dampening member 154. First, the magnetic attraction provides a normal force that supplements the compressive force in positively engaging the liner 158 against the pole 134. This is particularly advantageous where tolerance stacking would otherwise result in a liner 158 that does not engage, or only partially engages the pole 134. Second, the normal force of the magnetic attraction serves to increase the frictional force between the liner 158 and pole 134. This increased friction broadens the range of dampening member 154 compression values that effectively link the liner 158 to the pole 134 so that the dampening member effectively dampens vibrations of the magnet housing.

FIG. 7 graphically illustrates this result whereby the magnetic liner of the present invention allows a broader variation in dampening member 154 compression. It will be noted in the graph of FIG. 7 the normal force 161, $N_f$, is plotted against the compression 162 of the dampening member 154 for a non-magnetic liner 163 and for a magnetic liner 164. A threshold normal force 165 represents the minimum normal force necessary to sufficiently engage the pole 134 and liner 158 to provide effective dampening by the dampening member 154. It will be noted this minimal normal force is provided by the magnetic liner 164 at substantially zero compression 162 of the dampening member 154. A force below this threshold normal force 165 allows slippage of the liner 153 and pole 134 which thereby prevents effective dampening.

From the graphical representation of FIG. 7 it will be noted that the threshold normal force 165 is provided at a lower compression 162 for the magnetic liner 164 in comparison to that of the non-magnetic liner 163. The lower compression value thereby broadens the useable compression range 167 between the minimum compression and maximum desired compression.

This arrangement permits a shift in nominal design parameters that affect the compression of the dampening member 154. Where the prior art construction depended exclusively on compression of the damper 150 between the magnet housing and the enclosure, the present invention provides effective damping at lesser compressions and at no compression where the elastomeric member 156 selected is sufficiently ductile to span the gap between the magnet housing and enclosure in response to the magnetic forces discussed above.

Figure 8:
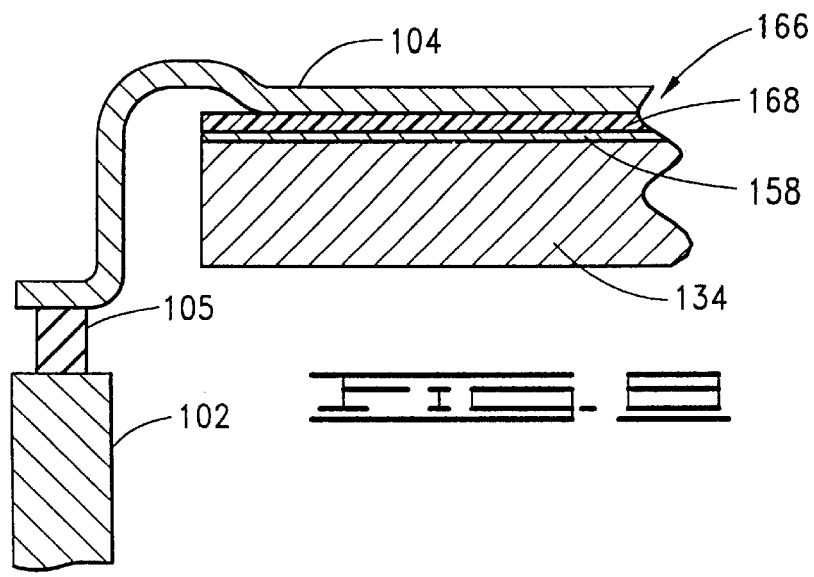
FIG. 8 is a sectional view of a portion of a damper that is constructed in accordance with an alternative preferred embodiment of the present invention.
Figure 9:
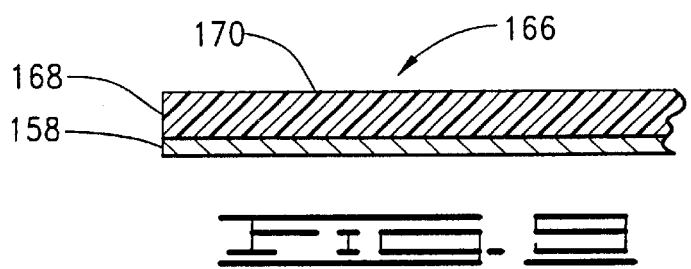
FIG. 9 is a sectional view of the damper of FIG. 7.

FIG. 8 shows an alternative embodiment of the present invention wherein a dampening member 166 has an elastomeric member 168 made of an elastomeric material. In a preferred embodiment the elastomeric member 168 is formed of a fluoroelastomer material. A material manufactured by DuPont under the trade name Viton is particularly well suited for the application of the present invention. As in the dampening member 154 of FIG. 6, the liner 158 is adhered to the elastomeric member 168 and interposed between the elastomeric member 168 and the pole 134. As shown in FIG. 9, the dampening member 166 can be adhered to the cover 104 (not shown) by a pressure sensitive adhesive (not shown) applied to a surface 170. A conventional double-sided pressure sensitive tape can be used in joining the surface 170 to the cover 104. Such an adhesive, or a recognized equivalent, can be used to join the liner 158 to the elastomeric member 168.

Figure 10:
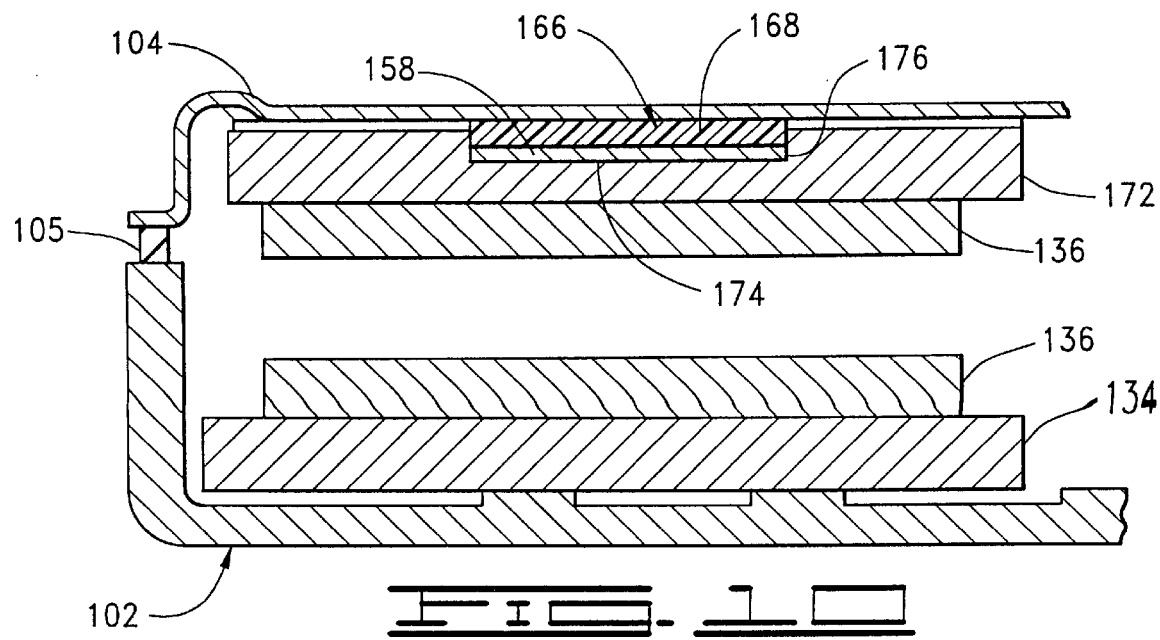
FIG. 10 is a sectional view of a damper that is constructed in accordance with an alternative preferred embodiment of the present invention.

FIG. 10 illustrates yet another contemplated embodiment of the present invention that provides increased attraction force of the liner 158 to the magnet assembly 132. As shown, a top pole 172 has an indentation 174 for receivingly engaging the dampening member 166. The magnetic attraction between the liner 158 and the pole 172, is increased by the increase in flux through the narrowed portion of the indentation. In addition to increasing the magnetic flux to the liner 158, the indentation 174 furthermore constrains the dampening member 166 so as to prevent lateral shifting to a relatively higher flux location, if a higher flux point exists that would otherwise tend to laterally shift the distal end of the dampening member 166 toward alignment with the higher flux point.

As in FIG. 8, a pressure sensitive adhesive can be used to adhere the elastomeric member 168 to the cover 104. It is advantageous, however, to not use such an adhesive to avoid the cost and assembly steps necessary to provide the bond. It will be noted that without the adhesion of the elastomeric member 168 to the cover 104 the effectiveness of the dampening member 166 is, as in the prior art, dependent on a minimal compression of the dampening member 166. This construction can lend itself to the disadvantages associated with corruption of the enclosure seal as illustrated by FIG. 3 and previously discussed. It has been discovered, however, that effective compression of the elastomeric member 168 without experiencing the gasket 105 corruption can reliably be achieved by utilizing the present invention as embodied in FIG. 10.

Figure 11:
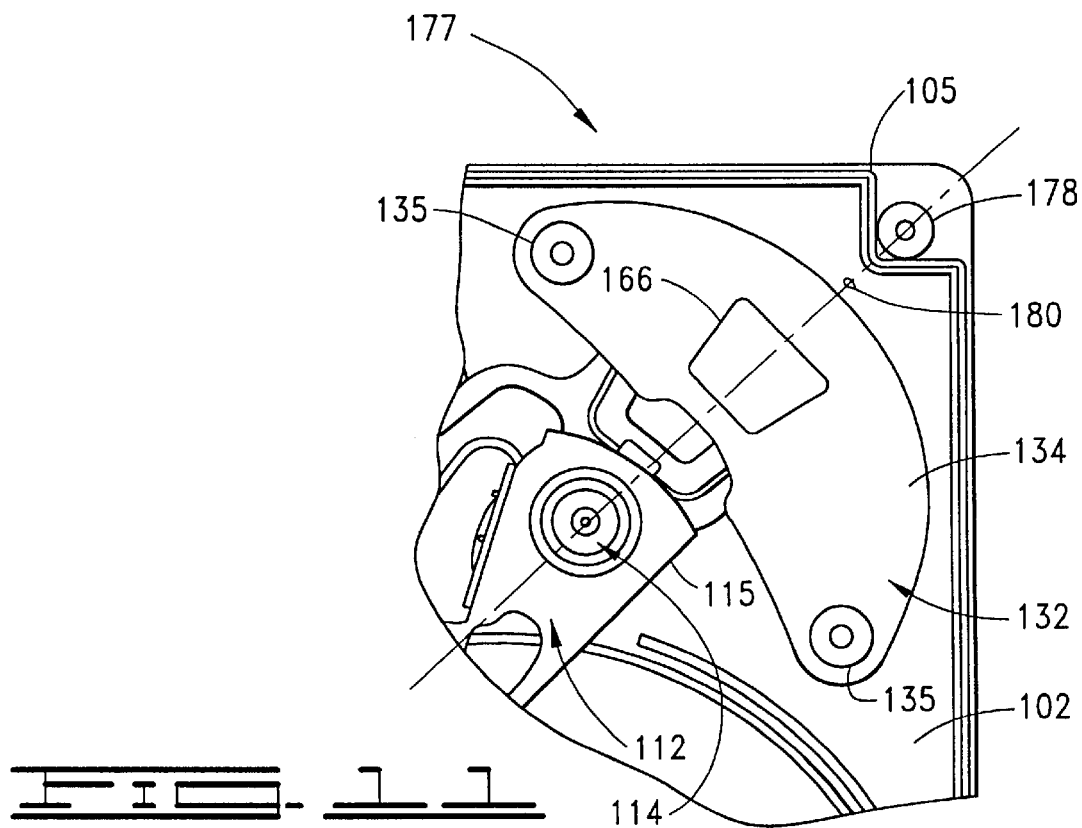
FIG. 11 is a plan view of a portion of the disc drive of FIG. 9 with the top cover not shown for clarity.

FIG. 11 shows a plan view of a portion of a disc drive 177 constructed in accordance with the present invention. One skilled in the art will recognize that the cover (not shown) is joined to the base deck 102 in a number of places, namely across the pivot bearing assembly 114 and at the boss 178. By locating the dampening member 166 symmetrically about a plane 180 passing through the longitudinal centers of the pivot bearing assembly 114 and the boss 178, a design is possible wherein even at a maximum designed compression the elastomeric member 168 will not corrupt the seal provided by the gasket 105 between the base deck 102 and the cover 104.

Figure 12:
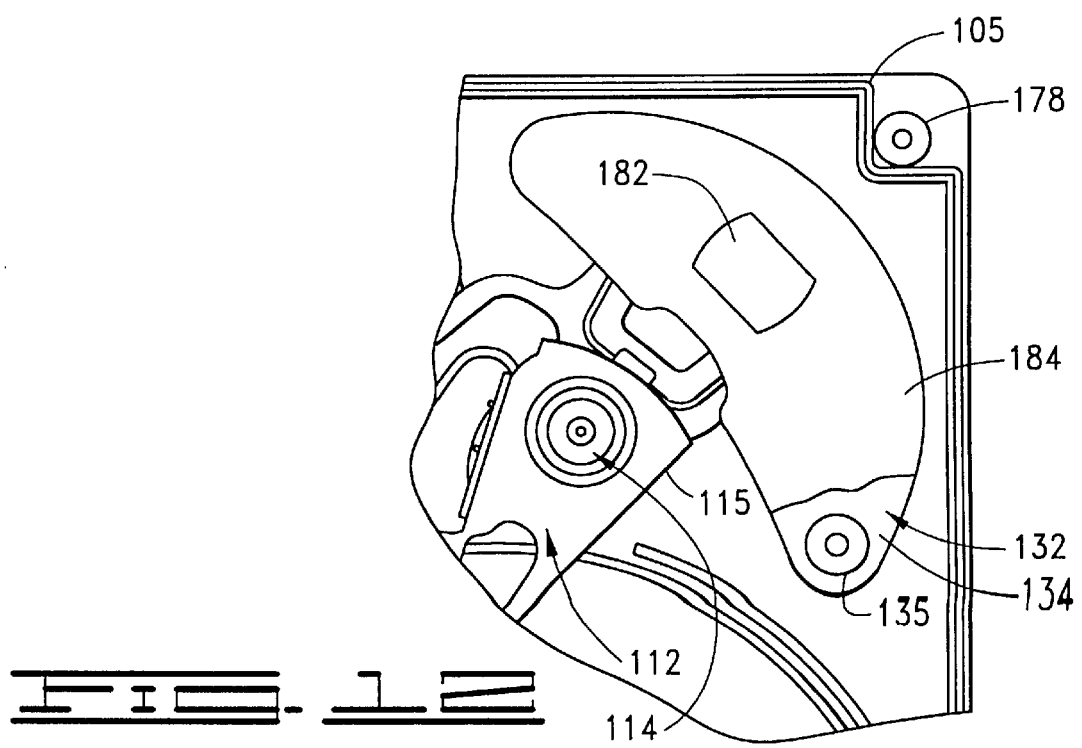
FIG. 12 is a plan view of the disc drive of FIG. 10 showing an alternative preferred embodiment of the damper.

FIG. 12 shows yet another alternative preferred embodiment wherein a dampening member 182 depends from a magnetically permeable liner 184 (shown in partial cut-away fashion) that is formed in a manner characteristic of the size and shape of the pole 134. In this manner, the liner 184 is self-aligning in attaching to the pole 134 by way of the magnetic attraction. This eliminates the need for an indentation in the pole 134, such as in the case of the indentation 174 in the pole 172 of FIG. 10.

It will noted that the exemplary positioning of the dampening member 166 as discussed above is illustrative, and that it may be advantageous to locate the dampening member 166 in a non-symmetric relationship to the enclosure attachment points. The present invention embodies a dampening member that is located and retained by magnetic attraction with the magnet assembly, and as such any position of the dampening member relative to the attachment points falls within the scope of the present invention.

The present invention provides a dampening member (such as 154) that is interposed between a pole (such as 134) of a magnet housing and a cover (such as 104) of an enclosure for a disc drive (such as 100). The dampening member dampens excitations forces transmitted by the magnet assembly in response to electro mechanical forces that are imparted to an actuator coil (such as 130) in pivoting an actuator assembly (such as 112) in order to radially locate a read/write head (such as 120) adjacent a desired track on a data disc (such as 108).

The dampening member is formed by a elastomeric member joined with a magnetically permeable liner (such as 158). In a preferred embodiment the elastomeric member is an elastomeric adhesive (such as 156) that adheres to the cover. In this manner, opposing attractive forces place tensile forces on the dampening member so that both the magnet housing and the enclosure operably engage the dampening member.

In an alternative preferred embodiment the elastomeric member is an elastomeric material (such as 168) which can be adhered to the cover, such as by the use of double-sided pressure sensitive tape. Adhesion of the dampening member to the cover can be eliminated by accurately positioning and operably retaining the dampening member relative to attachment points of the cover and a base deck (such as 102) that together form the disc drive enclosure. In one preferred embodiment, an indentation (such as 174) is provided in the magnet housing to increase the attraction force and constrain the damper motion. In an alternative preferred embodiment the liner of the dampening member is characteristically the same size and shape of a contacting surface of the magnet housing so that the dampening member is self-aligning relative to the magnet housing.

It is to be understood that even though numerous characteristics and advantages of various embodiments of the present invention have been set forth in the foregoing description, together with details of the structure and function of various embodiments of the invention, this disclosure is illustrative only, and changes may be made in details especially in matters of structure and arrangement of parts within the principles of the present invention to the full extent indicated by the broad general meaning of the terms in which the appended claims are expressed.

What is claimed is:

1. A damper for a disc drive for dampening a resonance that results from an electro mechanical force acting upon an actuator assembly during a data reading and writing operations between the actuator assembly and a data disc, wherein the electro mechanical force is created by a voice coil motor comprising an electrical coil interacting with a magnet assembly, the magnet assembly having a supporting magnet housing and generating a magnetic flux, the damper comprising:

an elastomeric member; and a magnetically permeable liner attached to the elastomeric member and magnetically attracted by the magnetic flux to the magnet assembly.

2. The damper of claim 1 wherein the disc drive is contained within a sealed enclosure, the elastomeric member being interposed between the magnetically permeable liner and the enclosure and pressingly engaging the enclosure.

3. The damper of claim 2 wherein an adhesive is interposed between the elastomeric member and the enclosure to provide a joined engagement therebetween.

4. The damper of claim 2 wherein the elastomeric member is attached to the enclosure and the liner is magnetically attached to the magnet housing.

5. The damper of claim 1 wherein the magnet housing has an indentation for increasing the magnetic flux to the magnetically permeable liner.

6. The damper of claim 1 wherein the liner is characteristically contoured to substantially match a size and a shape of a contact surface of the magnet housing to position and retain the damper.

7. The damper of claim 1 wherein the liner comprises a magnetically permeable stainless steel.

8. The damper of claim 1 wherein the elastomeric member comprises an acrylic polymer.

9. The damper of claim 1 wherein the elastomeric member comprises fluoroelastomer.

10. A disc drive, comprising:

an enclosure;

an actuator assembly within the enclosure;

a voice coil motor for operatively positioning the actuator assembly; and dampening means for dampening a resonance transmitted from the voice coil motor to the enclosure in operatively positioning the actuator assembly the dampening means magnetically attracted to the voice coil motor.

11. A disc drive comprising:

a base deck;

a cover joined to the base deck to form a sealed enclosure;

a spindle motor supported by the enclosure;

a rotating disc with a data surface supported by the spindle motor;

an actuator assembly pivotally supported by the enclosure for radially moving a read/write head in data reading and writing relationship to the data surface;

a voice coil motor that operatively positions the actuator assembly, the voice coil motor comprising a magnet assembly that generates a magnetic flux; and a damper for dampening a resonance created by the voice coil motor in operatively moving the actuator assembly, the damper comprising:

a elastomeric member; and a magnetically permeable liner attached to the elastomeric member and magnetically attracted to the magnet assembly by the magnetic flux.

12. The disc drive of claim 11 wherein the magnet assembly comprises:

a magnet housing, comprising:

a pair of magnetic poles; and a spacer supporting the magnetic poles in a spatially disposed and parallel relationship; and a pair of magnets supported by the magnet housing, wherein each magnet depends from one of the pair of magnetic poles.

13. The disc drive of claim 11 wherein the elastomeric member is interposed between the magnetically permeable liner and the enclosure and pressingly engages the enclosure.

14. The disc drive of claim 11 wherein the elastomeric member is attached to the enclosure and the liner is magnetically attached to the magnet housing.

15. The disc drive of claim 11 wherein the liner is characteristically contoured to substantially match a size and shape of a contact surface of the magnet housing to position and retain the damper by a magnetic attraction between the magnet housing and the magnetically permeable liner.

16. The disc drive of claim 11 wherein the liner comprises a magnetically permeable stainless steel.

17. The disc drive of claim 11 wherein the elastomeric member comprises an acrylic polymer.

18. The disc drive of claim 11 wherein the elastomeric member comprises a fluoroelastomer.

19. The disc drive of claim 11 wherein an adhesive is interposed between the elastomeric member and the enclosure to provide a joined engagement therebetween.

* * * * *